July 30, 1957 R. SUSEMIHL 2,800,778
APPARATUS FOR RECTIFYING PULLED THREADS IN KNITTED WARE
Filed Aug. 8, 1955
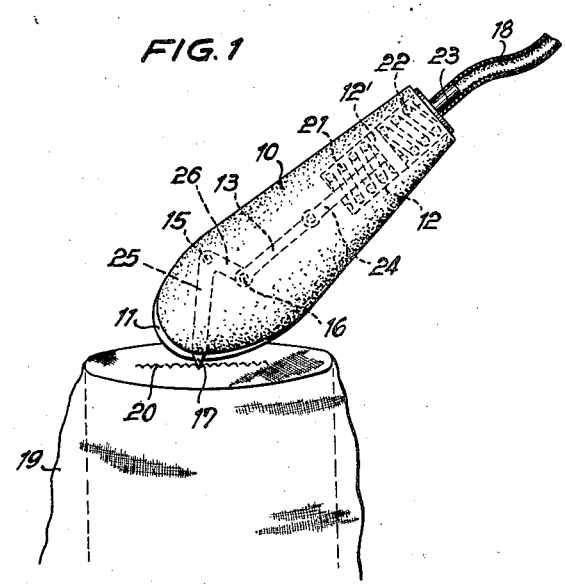
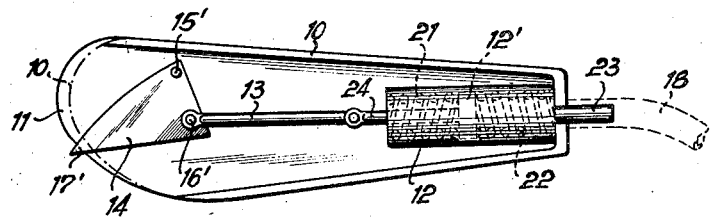
INVENTOR
Rolf Susemihl
By Bryant & Lowry
attys.

United States Patent Office 2,800,778
Patented July 30, 1957

2,800,778
APPARATUS FOR RECTIFYING PULLED THREADS IN KNITTED WARE

Rolf Susemihl, Frankfurt am Main, Germany

Application August 8, 1955, Serial No. 527,094
Claims priority, application Germany August 11, 1954

7 Claims. (Cl. 66—1)

The invention relates to apparatus for rectifying pulled threads in knitted ware, and more particularly to an apparatus by which a portion of the knitted material which is stretched and contains enlarged and contracted meshes, is subjected to a rapid succession of blows onto the wrongly placed meshes until all these meshes have attained their original dimensional size by pulling in and uniformly distributing the pulled thread.

The known apparatus of this type consist substantially of a distributor in the shape of a circular saw or a similarly operating rim of radially arranged bent rods, the ends of which beat the respective meshes. Owing to their relatively large size and the fact that they obscure the view of the place being worked these known apparatus are open to objection.

The disadvantages of the known apparatus are overcome by the invention, the novel feature of which is that a beater needle in the form of a double-armed angle lever or a plate substantially in the form of a triangle is pivotally mounted inside a handy casing and one end portion of the beater needle forms the needle point projecting for engagement with the work through a slot being provided in the casing and extending in the direction of movement of the needle point, whereas the beater needle is oscillatably movable by means of mechanical, electrical or pneumatical driving means.

Other features of the invention are hereinafter described and two preferred embodiments of the invention are illustrated by way of example in the accompanying drawing, in which:

Fig. 1 is a side elevation, partly in perspective and partly in section, showing an apparatus according to the invention in operative position upon a piece of fabric stretched over a suitable form;

Fig. 2 is a side elevation showing a modification, the apparatus being in opened state.

As shown in Fig. 1 the apparatus consists of a handy elongated casing 10 which is preferably composed of two dish-like halves and tapers in its longitudinal direction. That end portion of the casing 10, which is narrower than the other end portion houses a cylinder 12 in which a piston 12' is reciprocated by a column of air fed through a conduit 18. This column of air is produced by a separate mechanical, electrical or pneumatical air pump, not shown in the drawing, and moves to and fro in quick succession. The piston 12' is kept in an intermediate position by two helical pressure springs 21, 22 provided in the cylinder 12 at both sides of the piston 12'. A nipple 23 on the cylinder 12 projects through the end portion of the casing 10 and serves for connecting the apparatus to the conduit 18. The to and fro moving column of air generated by the said air pump effects an oscillatory motion of the piston 12' and a piston rod 24 secured thereto. A beater needle which in the embodiment shown in Fig. 1 is a double-arm angle lever 25, 26, is pivotally mounted on one or both side walls inside the casing 10 at 15. The lever arm 25, which is preferably longer than the lever arm 26 and extends approximately at a right angle therefrom, forms the point 17 of the beater needle and projects through a slot 11 formed by the two dish-like halves at the other end portion of the casing, whereas the other lever arm 26 of the beater needle is linked to one end of a connecting rod 13 at 16. The other end of the connecting rod 13 is linked to the piston rod 24 so that the oscillatory motion of the piston 12' is simultaneously transmitted to the angle lever 25, 26 through the intermediary of the connecting rod 13 and the needle point moves to and fro in the slot 11 of the casing 10 with corresponding frequency in order to give wrongly placed meshes 20 of a piece of fabric 19 their original dimensional size.

The end portions of the casing 10 which form the slot 11 may be transparent and formed as a projection on one or both of the dish-like halves.

Fig. 2 shows that it may be of particular advantage to form the beater needle as a plate 14 having substantially the form of a triangle one corner of which projects through the slot 11 in the casing 10 and forms the point 17' of the beater needle. Another corner of the triangle is pivotally mounted at 15' on the inner wall or walls of the casing 10, while the third corner is linked at 16' to the connecting rod 13. However, the plate 14 is not restricted to the form of a triangle and may be of various shapes.

From the above detailed description of the invention, it is believed that the construction will at once be apparent, and while there are herein shown and described two preferred embodiments of the invention, it is nevertheless to be understood that minor changes may be made therein without departing from the spirit and scope of the invention as claimed.

I claim:

1. An apparatus for rectifying pulled threads in knitted ware comprising in combination an elongated casing; a slot at one end of said casing; a beater needle pivotally mounted within the casing on at least one side wall of the casing and having an end portion forming the point of the beater needle and projecting through said slot in the casing for engagement with the work, said slot extending in the direction of movement of the beater needle; a cylinder mounted within the casing; a piston in said cylinder rapidly reciprocated by a driving means; a piston rod secured to said piston; and a connecting rod linked at one end to said piston rod and at its other end to said beater needle oscillatable in the plane of movement of said connecting rod.

2. An apparatus for rectifying pulled threads in knitted ware, as claimed in claim 1, wherein the beater needle consists of a double-armed angle lever.

3. An apparatus for rectifying pulled threads in knitted ware, as claimed in claim 1, wherein the beater needle consists of a plate substantially in the form of a triangle.

4. An apparatus for rectifying pulled threads in knitted ware, as claimed in claim 1, wherein the casing is composed of two dish-like halves and the slot provided at one end of said casing extends in the range of the oscillating needle point and forms a curved guide for said needle point.

5. An apparatus for rectifying pulled threads in knitted ware, as claimed in claim 1, wherein two helical pressure springs are provided in the cylinder at both sides of the piston.

6. An apparatus for rectifying pulled threads in knitted ware, as claimed in claim 1, wherein the end portions of the casing which form the slot are transparent.

7. An apparatus for rectifying pulled threads in knitted ware, as claimed in claim 1, wherein the end portions of the casing which form the slot are transparent and form at least one projection.

References Cited in the file of this patent

FOREIGN PATENTS 1,103,611    France ---------------- May 25, 1955